United States Patent Office 2,773,040
Patented Dec. 4, 1956

2,773,040

HEAT-PRODUCING COMPOSITIONS

George Walton, Sharonville, Ohio, assignor to The Drackett Company, Cincinnati, Ohio, a corporation of Ohio No Drawing. Application May 19, 1953, Serial No. 356,091

3 Claims. (Cl. 252—157)

This invention relates to new and improved compositions for the production of heat and is particularly concerned with the type of composition consisting of a mixture of dry ingredients which, when admixed with a water, are capable of reacting rapidly to liberate heat.

Mixtures of chemical agents for this purpose have long been in common use for supplying heat to so-called fireless cookers, for the cleaning of grease clogged drains, and for other purposes in which the generation of heat is required. A mixture frequently employed for this purpose includes as its essential heat-producing ingredients aluminum and an alkaline agent such as sodium or potassium hydroxide, the addition of water to the mixture causing the aluminum and alkali to react rapidly, producing both heat and mechanical agitation.

Mixtures of this character are conveniently prepared in substantially dry, divided form and one of the chief problems in the preparation of these compositions is that of obtaining a uniform distribution of aluminum, which is in minor amount, in the alkaline agent which is normally present in amount at least about eight times the amount by weight of aluminum.

The effective distribution of the aluminum is an important problem in large scale production, where it is essential that each small sample, of the amount which might be used in practice, truly and accurately represents the composition of the whole batch. Such small portions withdrawn from such a larger batch do not, as a general rule, perfectly express the average composition of the larger batch. It is thus necessary to describe the variation in aluminum content on a statistical basis; for example, in terms of Standard Deviation.

Actually, effective distribution is a function of particle size, shape, number of particles, degree of mixing, and such factors. Where the degree of mixing to which the batch is subjected is sufficient and proper, the other factors determine effective distribution. The effect of these factors, however, has not heretofore been understood.

It should be pointed out that a mere increase in the amount of aluminum present, without regard to particle size or shape, is not a sufficient answer to this problem of effective distribution because substantial increase in aluminum content beyond the amounts generally used results in reactions wherein the aluminum floats, so that the reaction occurs on the surface, or the rate of reaction is too rapid to accomplish satisfactorily the purpose of the mixture.

The need for effective aluminum distribution will be appreciated when one finds that small portions (30 grams) of a large batch (of perhaps several tons) containing about 4.0% of this metal can represent aluminum contents varying from 2.0% to 6.5%, with aluminum particle counts of about 90 pieces per gram and of approximate cubic shape.

The present invention is based on the discovery that a much more homogeneous mixture can be obtained when the aluminum particles are of substantially uniform size ranging from 150 to 350 particles per gram, and preferably from 225 to 275 particles per gram, the observance of such limitations on the aluminum particle size resulting in materially improved distribution of aluminum in the alkaline agent and other ingredients of the mixture, so that the mixture may be reacted with water to yield more uniform, readily reproducible and definitely predictable results. These considerations of particle size are of minor importance in their application to the constituents other than aluminum, due to the fact that they are present in such large proportion as to permit relatively effective homogeneous distribution in the mixture without difficulty.

It has also been found that the improved aluminum distribution achieved by the use of particles of aluminum of generally uniform size of the order indicated hereinbefore tends to narrow the range of the limits of the reaction, and thus obtain greater uniformity in the effectiveness of the product to produce the desired result.

Thus it can be shown that when the aluminum particle size is substantially larger than 150 particles per gram, the aluminum content of samples withdrawn from a large batch varies materially, indicating a non-homogeneous composition. Since heat-producing compositions are often sold in small cans for household use, for example the clearing of sinks and drains, the inclusion in a given can, or aliquot portion from such can, of less than the required quantity of aluminum may result in failure of the composition to react properly and to produce the amount of heat necessary to accomplish the intended purpose. On the other hand, samples which contain more aluminum than the average tend to foam.

Aluminum which is too finely divided, for instance having a particle size of more than 350 particles per gram, also reacts too rapidly with the alkaline agent in the presence of water, and tends to foam excessively. Further, the particles of aluminum tend to float, and thus fail to perform the important function of mechanically agitating the caustic, whereas particles of the proper size and shape tend to remain submerged and to agitate the caustic, thereby assisting the formation of a caustic solution. When the average aluminum particle size is substantially larger than 150 particles per gram, distribution of aluminum in the mixture is often far less uniform than that necessary to give a predictable and satisfactory result.

Optimum results are achieved, as hereinbefore indicated, by the employment of aluminum in substantially uniform particle size and shape, having from about 225 to about 275 particles per gram, and it is found on repeated analysis of small samples withdrawn from a large batch of alkali-aluminum mixture, in which the aluminum is in the preferred form, that the variation of aluminum content averages less than 0.4% (Standard Deviation). The reaction of such a product is quite uniform, sustained, and produces a minimum of foam.

My findings show that aluminum distribution is a continuous and complex function of particle size. This one factor, if considered alone, would impose no limiting minimum size; the smaller the aluminum particle the better the achievable distribution. The minimum limit is, instead, determined by the fact that if the mass of the particle is too small, the gas evolved on the metal surface makes it float, and its physical action in the over-all reaction taking place is reduced or nullified. This limit is rather critical, and with particles of approximately cubic shape, such as are now in use, is about 350 particles per gram. Since it is not practical to make all particles of identical size and shape, due to machine variability, a limit of about 275 pieces per gram is preferred.

From considerations of the relations between volume and surface for different particle shapes, it would be expected that the minimum size, in the case of spherical aluminum particles, might be 350 to 400 particles per gram. However, a practical method of producing such small, uniform, spherical aluminum pellets is not readily available.

Analyses of commercial products of this type indicates that little or no attention is given to the preparation of the aluminum in the form of particles of generally uniform size and shape. Furthermore, the average size of the aluminum particles in such products has been found to fall outside of the broader range within which the practical advantages of the invention may be realized. This is consistent with the published literature on the subject, from which it is apparent that the effect of uniformity of particle size and shape, and of the selection of particle size, has heretofore been ignored.

My invention is applicable to any heat-producing composition employing, as the principal heat-producing components, aluminum and an alkaline agent capable of reacting with the aluminum to produce heat in the presence of water. The alkaline agent commonly employed for the purpose, of course, is sodium hydroxide, and alkali metal hydroxides are preferred, but other alkaline agents functioning similarly may be used. Mixtures of different agents may be employed if desired.

The mixture may include, in addition to the principal heat-producing ingredients, such additional ingredients as may further the desired action, either to increase the production of heat or for other purposes incidental to the use for which the mixture is designed. For instance, oxidizing agents such as sodium nitrate are commonly employed to react with the hydrogen released during the principal reaction. Catalytic agents, additional heat-generating agents such as sodium chlorite, and inert ingredients acting merely as carriers or fillers, such as sodium chloride, may be employed. In general, whatever the constitution of the whole mixture, it is common practice to limit the aluminum content to from about 2% to about 8% by weight of the total composition, the alkaline agent being employed in an amount at least about twice that required for combination with the aluminum, often constituting the major ingredient of the composition.

It will be understood, however, that the present invention does not contemplate the production of an essentially new heat-producing composition and is not concerned with the formulation of the composition, excepting only generally as hereinbefore indicated. On the contrary, the invention relates solely to the discovery of the advantages flowing from the use of aluminum of substantially uniformly sized particles and of a size falling within the ranges hereinbefore indicated, being broadly applicable to compositions of the type in which the principal heat-producing components are aluminum and an alkaline agent, excepting only such compositions as contain additional agents functioning to impair substantially or to inhibit the heat-generating action of the alkali and aluminum. It will thus be appreciated that no limitation of the scope of the invention is intended by the following specific examples which are merely representative of preferred compositions to which the invention has been applied.

Example I

| | Parts |
|---|---|
| Aluminum cuttings (270 particles per gram, generally uniform size) | 4.27 |
| Caustic soda | 54.42 |
| Sodium chloride | 10.74 |
| Sodium nitrate | 30.57 |
| Total | 100.00 |

The foregoing ingredients are thoroughly mixed to obtain a homogeneous mixture. The composition so prepared is suitable for the clearing of clogged drains, sink traps, and the like. When 3 parts of this mixture are added to 10 parts water, immediate reaction occurs with the sustained liberation of a substantial amount of heat, considerable mechanical agitation being produced by the reaction. The variation of aluminum content in 30 grams aliquot portions of the above mixture showed a Standard Deviation of about 0.4%.

Example II

| | Parts |
|---|---|
| Aluminum cuttings (230 particles per gram, generally uniform size) | 4.75 |
| Caustic soda | 64.75 |
| Sodium nitrate | 30.50 |
| Total | 100.00 |

The foregoing ingredients are thoroughly mixed to obtain a homogeneous mixture; the composition so prepared is suitable for the clearing of clogged drains, sink traps, and the like. When 3 parts of this mixture are added to 10 parts water, immediate reaction occurs with the sustained liberation of a substantial amount of heat, considerable mechanical agitation being produced by the reaction. Aliquot 30 gram portions taken from the mixture of this example will show an aluminum content variation of about 0.5% (Standard Deviation).

Example III

| | Parts |
|---|---|
| Aluminum cuttings (250 particles per gram, generally uniform size) | 3.50 |
| Caustic soda | 58.00 |
| Sodium nitrate | 28.50 |
| Sodium chlorite | 10.00 |
| Total | 100.00 |

The foregoing ingredients are thoroughly mixed to obtain a homogeneous mixture; the composition so prepared is suitable for the clearing of clogged drains, sink traps, and the like. When 3 parts of this mixture are added to 10 parts water, immediate reaction occurs with the sustained liberation of a substantial amount of heat, considerable mechanical agitation being produced by the reaction. The variation of aluminum in 30 gram aliquot portions of the above mixture will show a stand deviation of about 0.4%.

Example IV

| | Parts |
|---|---|
| Aluminum cuttings (270 particles per gram, generally uniform size) | 5.50 |
| Caustic soda | 63.50 |
| Sodium nitrate | 31.00 |
| Total | 100.00 |

The foregoing ingredients are thoroughly mixed to obtain a homogeneous mixture; the composition so prepared is suitable for the clearing of clogged drains, sink traps, and the like. When 3 parts of this mixture are added to 10 parts water, immediate reaction occurs with the sustained liberation of a substantial amount of heat, considerable mechanical agitation being produced by the reaction. Aliquot 30 gram portions taken from the mixture of this example will show an aluminum content variation of about 0.4% (standard deviation).

Example V

| | Parts |
|---|---|
| Aluminum cuttings (270 particles per gram, generally uniform size) | 4.12 |
| Caustic soda | 52.00 |
| Sodium chloride | 43.88 |
| Total | 100.00 |

The foregoing ingredients are thoroughly mixed to obtain a homogeneous mixture; the composition so prepared is suitable for the clearing of clogged drains, sink traps, and the like. When 3 parts of this mixture are added to 10 parts water, immediate reaction occurs with the sustained liberation of a substantial amount of heat, considerable mechanical agitation being produced by the reaction. The variation of aluminum content in 30 gram aliquot portions of the above mixture will be about 0.4% (standard deviation).

Having thus described the invention, what is claimed as new and desired to be secured by Letters Patent is:

1. A composition liberating heat when added to water, comprising, in admixture in substantially dry and divided form, and as discrete particles, from about 2% to about 8% aluminum by weight of the composition, and an alkali metal hydroxide in an amount at least twice the theoretical amount required for combination with the aluminum, the aluminum being in the form of particles of substantially uniform size averaging from about 150 to about 350 particles per gram.

2. A composition liberating heat when added to water, comprising, in admixture in substantially dry and divided form, and as discrete particles, from about 2% to about 8% aluminum by weight of the composition, and an alkali metal hydroxide in an amount at least twice the theoretical amount required for combination with the aluminum, the aluminum being in the form of particles of substantially uniform size averaging from about 225 to about 275 particles per gram.

3. A composition liberating heat when added to water, comprising, in admixture in substantially dry and divided form, and as discrete particles, from about 2% to about 8% aluminum by weight of the composition, and an excess of caustic soda, the aluminum being in the form of particles of substantially uniform size within the range of 225 to 275 particles per gram.

References Cited in the file of this patent

UNITED STATES PATENTS

| | | |
|---|---|---|
| 1,019,377 | Smith | Mar. 5, 1912 |
| 1,814,741 | Dulany | July 14, 1931 |
| 1,859,036 | Hall | May 17, 1932 |
| 1,938,560 | Hunter | Dec. 5, 1933 |
| 2,010,800 | Adams et al. | Aug. 13, 1935 |
| 2,371,436 | Gangloff et al. | Mar. 13, 1945 |
| 2,676,153 | MacMahon | Apr. 20, 1954 |